United States Patent
Liu et al.

(10) Patent No.: US 12,224,994 B1
(45) Date of Patent: Feb. 11, 2025

(54) IDENTITY AUTHENTICATION SYSTEM FOR DISTRIBUTED INTERNET OF VEHICLES

(71) Applicant: Guangdong University of Technology, Guangdong (CN)

(72) Inventors: Chang Liu, Guangdong (CN); Hongmin Wei, Guangdong (CN); Jiacheng Xu, Guangdong (CN); Guojun Han, Guangdong (CN); Yi Fang, Guangdong (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/825,028

(22) Filed: Sep. 5, 2024

(30) Foreign Application Priority Data

Mar. 29, 2024 (CN) .......................... 202410372138.8

(51) Int. Cl.
*H04L 9/40* (2022.01)
*H04L 67/12* (2022.01)

(52) U.S. Cl.
CPC .............. *H04L 63/08* (2013.01); *H04L 67/12* (2013.01)

(58) Field of Classification Search
CPC ................................ H04L 63/08; H04L 67/12
USPC .......................................................... 726/4
See application file for complete search history.

(56) References Cited

U.S. PATENT DOCUMENTS

| | | | |
|---|---|---|---|
| 2021/0203491 A1 | 7/2021 | Wei et al. | |
| 2021/0204306 A1* | 7/2021 | Li | H04B 7/155 |
| 2022/0105926 A1* | 4/2022 | Zhang | G08G 1/162 |

FOREIGN PATENT DOCUMENTS

| | | |
|---|---|---|
| CN | 106302500 A | 1/2017 |
| CN | 111885545 A | 11/2020 |
| CN | 116318606 A | 6/2023 |
| CN | 116760619 A | 9/2023 |
| WO | 2023188437 A1 | 10/2023 |

* cited by examiner

*Primary Examiner* — Benjamin A Kaplan

(57) ABSTRACT

Disclosed is an identity authentication system for distributed Internet of vehicles (IoV), including a core cloud, a plurality of edge clouds, a plurality of road side units (RSUs) and a plurality of terminal vehicles. The core cloud stores registration information about the terminal vehicles and the RSUs; the edge cloud performs identity verification on the RSUs according to the registration information, and after the verification is passed, the edge cloud generates a temporary shared session key and sends the same to the RSU and the terminal vehicle, and the RSU and the terminal vehicle establish encrypted communication according to the temporary shared session key, to provide a network communication service for the terminal vehicle. In the present disclosure, a vehicle identity authentication efficiency in a scene with a large traffic density can be effectively improved.

6 Claims, 1 Drawing Sheet

IDENTITY AUTHENTICATION SYSTEM FOR DISTRIBUTED INTERNET OF VEHICLES

CROSS-REFERENCE TO RELATED APPLICATION

This application claims priority of Chinese Patent Application No. 202410372138.8, filed on Mar. 29, 2024, the entire contents of which are incorporated herein by reference.

TECHNICAL FIELD

The present disclosure relates to the technical field of digital information transmission, and more particularly to an identity authentication system for distributed Internet of vehicles (IoV).

BACKGROUND

In order to better meet the needs of highly dynamic IoV, the efficiency requirements for vehicle identity authentication are also increasing. As a traditional identity authentication solution of IoV, a centralized solution is inefficient and easy to form a single point of failure due to its high dependence on a central authentication server, thereby affecting the stability and reliability of the overall system. Therefore, it has become an important research direction for experts and scholars in this field to research and develop an identity authentication solution for distributed or decentralized IoV to improve the robustness and efficiency of the system.

At present, an identity authentication solution based on an edge cloud has been widely concerned, which reduces the burden of a central cloud and improves the real-time performance by means of edge computing. The combination of elliptic curve cryptography (ECC) and a key exchange protocol has become an efficient identity authentication policy. ECC is preferred because of a small key size and high security, and a key exchange protocol matched with it further ensures the key security and integrity in a communication process.

However, although the solution has obvious advantages in efficiency and security, it still faces computational challenges when dealing with the large amount of real-time data generated by high-speed moving vehicles, especially in an environment of high vehicle density, the computing and storage resources requirements of edge nodes are very high, and there are problems that data processing is not timely, complex bilinear pairing and time-consuming inverse operation in an elliptic curve digital signature algorithm (ECDSA) are required, and low communication and computational overhead cannot be performed, resulting in low efficiency of vehicle identity authentication.

SUMMARY

In order to solve the problem that the calculation and storage resources of the existing vehicle identity authentication technology can't achieve low communication and computational overhead in an environment of high vehicle density, leading to low efficiency of vehicle identity authentication, the present disclosure provides an identity authentication system for distributed IoV, which can achieve low communication and computation cost in a scene of high traffic density, at the same time, enhance the scalability and anti-attack ability of the system, and improve the efficiency of vehicle identity authentication.

In order to achieve the object of the present disclosure, the present disclosure provides the following technical solutions.

An identity authentication system for distributed IoV includes a core cloud, a plurality of edge clouds, a plurality of road side units (RSUs) and a plurality of terminal vehicles.

The core cloud establishes a wired communication connection with each of the edge clouds, each of the edge clouds establishes a wired communication connection with the plurality of RSUs, and each of the RSUs establishes a wireless communication connection with the plurality of terminal vehicles, a wired connection being established between the edge clouds; and the core cloud stores registration information about the terminal vehicles and the RSUs, and the core cloud shares the registration information about the terminal vehicle and the RSUs to the edge clouds.

The terminal vehicle sends an identity authentication request for IoV to the RSU; the RSU acquires the registration information about the terminal vehicle from the edge cloud; the RSU verifies identity information about the terminal vehicle according to the registration information; after the verification is passed, the RSU initiates an identity authentication request to the edge cloud; the edge cloud performs identity verification on the RSU according to the registration information; after the identity verification of the RSU is passed, the edge cloud backs up the identity information about the terminal vehicle among all the edge clouds and generates a temporary shared session key; and the edge cloud sends the temporary shared session key to the RSU, the RSU sends the temporary shared session key to the terminal vehicle, and the terminal vehicle, the RSU and the edge cloud establish encrypted communication between each other according to the temporary shared session key to provide a network communication service for the terminal vehicle.

In the above technical solution, wired network connections are established between the core cloud and the plurality of edge clouds; when the edge cloud has a fault or the working load is overloaded during the operation of IoV service, the core cloud can replace the edge cloud or provide additional computing, caching and communication services for the edge cloud, thereby providing a reliable network environment for the edge clouds and the terminal vehicles; and the core cloud has sufficient cloud resources to resist potential external attacks, ensuring the security of the system. The edge cloud is set between the core cloud and the RSU, and a high-quality network service can be provided for the terminal vehicle by using the edge cloud to assist the core cloud, and real-time behavior recording is performed on the terminal vehicle which passes the authentication, and the recorded data is quickly backed up among the edge clouds, to ensure that the terminal vehicle can maintain a normal networking service during driving. The arranged RSU provides a link interface between the terminal vehicle and the edge cloud, and assists the edge cloud to authenticate the terminal vehicle, thereby providing a network service with a more stable link environment for the terminal vehicle, which can achieve low communication and computational overhead in a scene of high traffic density, and improve the efficiency of vehicle identity authentication.

Preferably, the edge cloud is arranged with a Cybertwin edge server, and the Cybertwin edge server is used for acquiring and recording behavior data of authenticated terminal vehicles within a signal range of the edge cloud in real time, and quickly backing up and migrating the behavior data among all the edge clouds.

Preferably, the Cybertwin edge server detects, in real time, a vehicle density of terminal vehicles establishing authentication communication with the RSU within the signal range of the edge cloud, and sets a vehicle density threshold value according to the vehicle density; and when a vehicle density in a certain RSU within the signal range of the edge cloud exceeds the vehicle density threshold value, the Cybertwin edge server performs proxy authentication on terminal vehicles in the RSU.

Cybertwin represents network twinning.

Preferably, the Cybertwin edge server sets a proxy selection factor $\delta_m$ according to the vehicle density threshold value, and selects the terminal vehicle within the signal range of the edge cloud to perform proxy authentication according to the proxy selection factor, an expression of the proxy selection factor $\delta_m$ being:

$$\delta_m = \alpha_1 * \sum_{l=1}^{N} \left| \frac{d_{m,l}}{ND_{max}} \right| + \alpha_2 * \sum_{l=1}^{N} \left| \frac{v_l - v_m}{Nv_m} \right| + \alpha_3 * \frac{C_{max} - C_m}{C_{max}} + \alpha_4 * \frac{Rep_{max} - Rep_m}{Rep_{max}}$$

where $\alpha_1, \alpha_2, \alpha_3, \alpha_4 \in [0,1]$ represent natural numbers and $\alpha_1+\alpha_2+\alpha_3+\alpha_4=1$; $d_{m,l}$ represents a Euclidean distance between a terminal vehicle $v_m$ and a terminal vehicle $v_l$; N represents a total number of vehicles within a communication range of an edge cloud; and $D_{max}$, $C_{max}$, and $Rep_{max}$ represent a maximum communication distance, a maximum computing power, and a maximum credit score of the terminal vehicle, respectively.

Preferably, the system further includes an authentication proxy vehicle, used for selecting, by the Cybertwin edge server, a terminal vehicle within a signal range as a dynamic authentication proxy vehicle to perform identity verification for IoV on other terminal vehicles according to a proxy factor when a vehicle density in a certain RSU in an edge cloud range to which the RSU belongs exceeds the vehicle density threshold value.

In the above technical solution, a Cybertwin edge server, arranged in the edge cloud, can acquire behavior data of the terminal vehicles in the IoV in real time, and quickly back up the acquired behavior data among various edge clouds; and at the same time, the Cybertwin edge server can upload the acquired behavior data to the core cloud for storage. The Cybertwin edge server can also monitor the vehicle density of the terminal vehicles within the signal range of the edge cloud. When it is monitored that the vehicle density is higher than the vehicle density threshold value, the Cybertwin edge server will select the terminal vehicle within the signal range as a dynamic authentication proxy vehicle to perform identity authentication for IoV on other terminal vehicles according to a set proxy selection factor, and provide the network connection service for the terminal vehicles which have passed the authentication.

Preferably, the terminal vehicle sends an information registration application to the core cloud, and sends vehicle attribute information to the core cloud; the core cloud queries the vehicle attribute information sent by the terminal vehicle in a database, if registration information consistent with the vehicle attribute information about the terminal vehicle is queried, it being indicated that the terminal vehicle has registered information in the core cloud; and if vehicle attribute information about the terminal vehicle is not queried, the core cloud generating a pseudo identity for the terminal vehicle; and the core cloud saves the pseudo identity to the database and sends the same to the terminal vehicle;

the vehicle attribute information including vehicle information and vehicle owner information.

Preferably, the RSU sends an information registration application to the core cloud, and sends unique attribute information about the RSU to the core cloud; the core cloud queries the unique attribute information sent by the RSU in the database, if registration information consistent with the unique attribute information about the RSU is queried, it being indicated that the RSU has registered information in the core cloud; and if the unique attribute information about the RSU is not queried, the core cloud establishing a piece of signature registration information for the RSU; and the core cloud saves the signature registration information to the database and sends the same to the RSU;

the unique attribute information including operator information, deployment location information and a device number.

In the above technical solution, all the terminal vehicles in the system need to register information in the core cloud, and the vehicle information of the terminal vehicles and the vehicle owner information are sent to the core cloud in the form of data packets. The core cloud queries the received data packets in an information registry of a database. If the registration information corresponding to the terminal vehicle is queried in the information registry, it is indicated that the terminal vehicle is registered, and the identity authentication for IoV can be performed on the terminal vehicle. At the same time, the RSU in the system also needs to register information in the core cloud, and the identity authentication service for IoV can be provided for the terminal vehicle only after the information registration. The information registration between the terminal vehicle and the RSU can improve the security and reliability of the RSU, thereby improving the service quality of a terminal vehicle user.

Preferably, the RSU sets a first freshness threshold value according to an identity authentication request for IoV sent by the terminal vehicle, performs freshness detection on the identity authentication request for IoV sent by the terminal vehicle, retains the identity authentication request for IoV sent by the terminal vehicle within the first freshness threshold value, and verifies the registration information about the terminal vehicle; and the RSU generates a temporary session key for the verified terminal vehicle, and a temporary session public key corresponding to the temporary session key, the authentication information about the terminal vehicle and the unique attribute information about the RSU are sent to the edge cloud in a form of a data packet to perform identity authentication for IoV;

the freshness threshold value representing that the authentication request within the threshold value satisfies a time flow required for the identity authentication for IoV.

Preferably, the edge cloud sets a second freshness threshold value according to an identity authentication request for IoV sent by the RSU, performs freshness detection on the identity authentication request for IoV sent by the RSU, retains the identity authentication request for IoV sent by the RSU within the second freshness threshold value, and verifies the registration information about the RSU; and the edge cloud generates a corresponding temporary shared session key and signature for the verified RSU, and sends a corresponding temporary shared session public key and signature to the RSU.

Preferably, the RSU performs signature verification on the temporary shared session key and signature sent by the edge cloud, generates an independent temporary shared session key and signature after the verification is passed, and sends the same to the terminal vehicle; and the terminal vehicle performs signature authentication on the temporary shared session key and the signature sent by the RSU, and after the verification is passed, the terminal vehicle establishes encrypted communication with the RSU and the edge cloud according to the temporary shared session key, to acquire a reliable network communication service.

In the above technical solution, the setting of the first freshness threshold value and the second freshness threshold value can effectively exclude an identity authentication application for IoV sent by the terminal vehicle and having a large time difference, thereby reducing the workload of the RSU and the edge cloud, and improving the efficiency of the identity authentication for IoV of the system, and at the same time, ensuring that the terminal vehicle user can obtain a more effective network connection service. The setting of the temporary shared session key and the signature for identity authentication can effectively improve the security and reliability of the system, thereby improving the service quality for the terminal vehicle user.

Compared with the prior art, the present disclosure has the following advantageous effects.

The present disclosure provides an identity authentication system for distributed IoV. Firstly, wired network connections are established between the core cloud and the plurality of edge clouds; when the edge cloud has a fault or the working load is overloaded during the operation of IoV service, the core cloud can replace the edge cloud or provide additional computing, caching and communication services for the edge cloud, thereby providing a reliable network environment for the edge clouds and the terminal vehicles; and the core cloud has sufficient cloud resources to resist potential external attacks, ensuring the security of the system. Sequentially, the edge cloud is set between the core cloud and the RSU, and a high-quality network service can be provided for the terminal vehicle by using the edge cloud to assist the core cloud, and real-time behavior recording is performed on the terminal vehicle which passes the authentication, and the recorded data is quickly backed up among the edge clouds, to ensure that the terminal vehicle can maintain a normal networking service during driving. Finally, the arranged RSU provides a link interface between the terminal vehicle and the edge cloud, and assists the edge cloud to authenticate the terminal vehicle, thereby providing the terminal vehicle with a network service with a more stable link environment, which can achieve low communication and computational overhead in a scene of high traffic density, and improve the efficiency of vehicle identity authentication.

DETAILED DESCRIPTION

To facilitate the understanding of the present disclosure, the present disclosure is described more comprehensively with reference to related accompanying drawings. Preferred examples of the present disclosure are shown in the accompanying drawings. However, the present disclosure can be implemented in many different forms and is not limited to the examples described herein. On the contrary, these examples are provided for a more thorough and comprehensive understanding of the disclosure of the present disclosure.

It is to be noted that when an element is said to be "fixed" to another element, it can be directly fixed to another element or fixed to an element therebetween. When an element is considered to be "connected" to another element, it can be directly connected to another element or connected to an element therebetween. The terms "vertical", "horizontal", "left", "right" and similar expressions used herein are illustrative only.

Unless otherwise defined, all technical and scientific terms used herein have the same meaning as commonly understood by those skilled in the technical field of the present disclosure. The terms used herein in the specification of the present disclosure are only for the purpose of describing specific examples, and are not intended to limit the present disclosure. The term "and/or" used herein includes any and all combinations of one or more of related listed items.

Example 1

Figure 1:
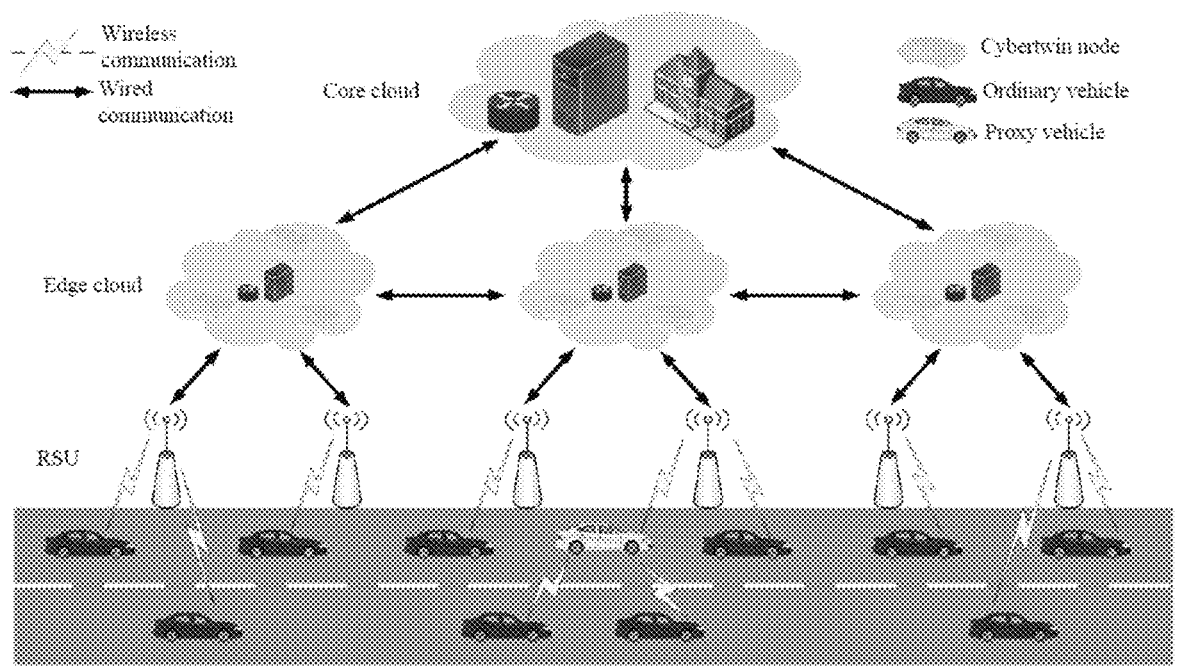
FIG. 1 is a schematic structural diagram of an identity authentication system for distributed IoV provided in an example of the present application.

The example provides an identity authentication system for distributed IoV, referring to FIG. 1, including a core cloud, a plurality of edge clouds, a plurality of RSUs and a plurality of terminal vehicles.

The core cloud establishes a wired communication connection with each of the edge clouds, each of the edge clouds establishes a wired communication connection with the plurality of RSUs, and each of RSUs establishes a wireless communication connection with the plurality of the terminal vehicles, a wired connection being established between the edge clouds; and the core cloud stores registration information about the terminal vehicles and the RSUs, and the core cloud shares the registration information about the terminal vehicle and the RSUs to the edge clouds.

The terminal vehicle sends an identity authentication request for IoV to the RSU; the RSU acquires the registration information about the terminal vehicle from the edge cloud; the RSU verifies identity information about the terminal vehicle according to the registration information; after the verification is passed, the RSU initiates an identity authentication request to the edge cloud; the edge cloud performs identity verification on the RSU according to the registration information; after the identity verification of the RSU is passed, the edge cloud backs up the identity information about the terminal vehicle among all the edge clouds and generates a temporary shared session key; and the edge cloud sends the temporary shared session key to the RSU, the RSU sends the temporary shared session key to the terminal vehicle, and the terminal vehicle, the RSU and the edge cloud establish encrypted communication between each other according to the temporary shared session key to provide a network communication service for the terminal vehicle.

An ordinary vehicle in FIG. 1 is a terminal vehicle.

In a preferred example, referring to FIG. 1, the edge cloud is arranged with a Cybertwin edge server, and the Cybertwin edge server is used for acquiring and recording behavior data of authenticated terminal vehicles within a signal range of the edge cloud in real time, and quickly backing up and migrating the behavior data among all the edge clouds.

In a preferred example, the Cybertwin edge server detects, in real time, a vehicle density of terminal vehicles establishing authentication communication with the RSU within the signal range of the edge cloud, and sets a vehicle density threshold value according to the vehicle density; and when a vehicle density in a certain RSU within the signal range of the edge cloud exceeds the vehicle density threshold value, the Cybertwin edge server performs proxy authentication on terminal vehicles in the RSU.

Cybertwin represents network twinning.

In a preferred example, the Cybertwin edge server sets a proxy selection factor $\delta_m$ according to the vehicle density threshold value, and selects the terminal vehicle within the signal range of the edge cloud to perform proxy authentication according to the proxy selection factor, an expression of the proxy selection factor $\delta_m$ being:

$$\delta_m = \alpha_1 * \sum_{l=1}^{N} \left| \frac{d_{m,l}}{ND_{max}} \right| + \alpha_2 * \sum_{l=1}^{N} \left| \frac{v_l - v_m}{Nv_m} \right| + \alpha_3 * \frac{C_{max} - C_m}{C_{max}} + \alpha_4 * \frac{Rep_{max} - Rep_m}{Rep_{max}}$$

where $\alpha_1, \alpha_2, \alpha_3, \alpha_4 \in [0,1]$ represent natural numbers and $\alpha_1+\alpha_2+\alpha_3+\alpha_4=1$; $d_{m,l}$ represents a Euclidean distance between a terminal vehicle $v_m$ and a terminal vehicle $v_l$; N represents a total number of vehicles within a communication range of an edge cloud; and $D_{max}$, $C_{max}$, and $Rep_{max}$ represent a maximum communication distance, a maximum computing power, and a maximum credit score of the terminal vehicle, respectively.

In a preferred example, referring to FIG. 1, the system further includes an authentication proxy vehicle, used for selecting, by the Cybertwin edge server, a terminal vehicle within a signal range as a dynamic authentication proxy vehicle to perform identity verification for IoV on other terminal vehicles according to a proxy factor when a vehicle density in a certain RSU in an edge cloud range to which the RSU belongs exceeds the vehicle density threshold value.

It can be understood that the Cybertwin edge server, arranged in the edge cloud, can acquire behavior data of the terminal vehicles in the IoV in real time, and quickly back up the acquired behavior data among various edge clouds; and at the same time, the Cybertwin edge server can upload the acquired behavior data to the core cloud for storage. The Cybertwin edge server can also monitor the vehicle density of the terminal vehicles within the signal range of the edge cloud. When it is monitored that the vehicle density is higher than the vehicle density threshold value, the Cybertwin edge server will select the terminal vehicle within the signal range as a dynamic authentication proxy vehicle to perform identity authentication for IoV on other terminal vehicles according to a set proxy selection factor, and provide the network connection service for the terminal vehicles which have passed the authentication.

In the example, wired network connections are established between the core cloud and the plurality of edge clouds; when the edge cloud has a fault or the working load is overloaded during the operation of IoV service, the core cloud can replace the edge cloud or provide additional computing, caching and communication services for the edge cloud, thereby providing a reliable network environment for the edge clouds and the terminal vehicles; and the core cloud has sufficient cloud resources to resist potential external attacks, ensuring the security of the system. The edge cloud is set between the core cloud and the RSU, and a high-quality network service can be provided for the terminal vehicle by using the edge cloud to assist the core cloud, and real-time behavior recording is performed on the terminal vehicle which passes the authentication, and the recorded data is quickly backed up among the edge clouds, to ensure that the terminal vehicle can maintain a normal networking service during driving. The arranged RSU provides a link interface between the terminal vehicle and the edge cloud, and assists the edge cloud to authenticate the terminal vehicle, thereby providing a network service with a more stable link environment for the terminal vehicle, which can achieve low communication and computational overhead in a scene of high traffic density, and improve the efficiency of vehicle identity authentication.

Example 2

In the example, the identity authentication of terminal vehicles for IoV is further explained.

In a preferred example, the terminal vehicle sends an information registration application to the core cloud, and sends vehicle attribute information to the core cloud; the core cloud queries the vehicle attribute information sent by the terminal vehicle in a database, if registration information consistent with the vehicle attribute information about the terminal vehicle is queried, it being indicated that the terminal vehicle has registered information in the core cloud; and if vehicle attribute information about the terminal vehicle is not queried, the core cloud generating a pseudo identity for the terminal vehicle; and the core cloud saves the pseudo identity to the database and sends the same to the terminal vehicle;

the vehicle attribute information including vehicle information and vehicle owner information.

In a preferred example, the RSU sends an information registration application to the core cloud, and sends unique attribute information about the RSU to the core cloud; the core cloud queries the unique attribute information sent by the RSU in the database, if registration information consistent with the unique attribute information about the RSU is queried, it being indicated that the RSU has registered information in the core cloud; and if the unique attribute information about the RSU is not queried, the core cloud establishing a piece of signature registration information for the RSU; and the core cloud saves the signature registration information to the database and sends the same to the RSU;

the unique attribute information including operator information, deployment location information and a device number.

In some examples, in the system, the core cloud needs to initialize system parameters Param=(q, $F_q$, c, d, G, n, b, H) via a trusted authority (TA), where q is a big prime number for determining a finite field $F_q$, $F_q$ is a finite field of (b−1) bit coding, parameters c and d (c, d∈$F_q$) determine a set of all point groups that distort the Edwards curve, $E_{c,d}$: $cx^2 + y^2 = 1 + dx^2y^2$, H is a hash function for generating a 2b-bit output, representing as $H:\{0,1\}^* \rightarrow \{0,1\}^{2b}$, and n is a prime number located in an interval $(2^{b-4}, 2^{b-3})$, representing an order of a base point G. The TA generates a key pair ($sk_{TA}$, $PK_{TA}$) based on these parameters, and assigns the key pair ($sk_{TA}$, $PK_{TA}$) to the Cybertwin edge server $C_k$. Finally, the TA publishes system common parameters.

When the terminal vehicle $V_i$ joins the system for first time, it must register with the TA to obtain relevant information. After obtaining the public parameters from the TA, the terminal vehicle $V_i$ firstly generates $sk_i \in Z^*_q$ as a private key, and calculates a public key $PK_i = sk_i \cdot G$. Sequentially, the terminal vehicle $V_i$ sends unique attribute information $Atr_i$ (including vehicle information, vehicle owner information, etc.) and the public key $PK_i$ to the TA via a secure channel. The TA performs a hash operation: $RID_i = H(Atr_i)$. If $RID_i$ is queried, it is indicated that $PK_i$ already exists in the database, which means that the vehicle has been registered. Otherwise, the TA generates a unique pseudo identity $PID_i = RID_i \oplus H(sk_{TA} \cdot PK_i \| T_e)$ for the terminal vehicle $V_i$, where $T_e$ is a validity period of $PID_i$. The TA uses the private key to sign $PID_i$ and $PK_i$ to generate $\sigma_i^{TA} = Sig_{TA}(PID_i \| PK_i)$. Finally, the TA stores $\{Atr_i, RID_i, PK_i, T_e\}$ in the database and sends $\{PID_i, PK_{TA}, T_e, \sigma_i^{TA}\}$ to $V_i$ in a secure manner.

The RSU $R_j$ is deployed by a plurality of operators to provide the IoV service for the terminal vehicle, and a registration process of the RSU is similar to that of the vehicle registration. Firstly, a key pair ($sk_j$, $PK_j$) is generated, and the RSU $R_j$ sends unique attribute information $Atr_j$ (including operator information, deployment location information, a device number, etc.) and $PK_j$ to the TA via a secure channel. Sequentially, the TA, based on $Atr_j$, $PK_j$, queries whether it already exists in the database, and if so, it is indicated that the RSU is registered in the core cloud TA. Otherwise, the core cloud TA uses a private key to sign $PK_j$ to generate $\sigma_j^{TA} = Sig_{TA}(PK_j)$. Finally, the core cloud TA stores $\{Atr_j, PK_j, T_e\}$ in the database and sends $\{PK_{TA}, T_e, \sigma_j^{TA}\}$ to RSU $R_j$ in a secure manner.

In the present example, all the terminal vehicles in the system need to register information in the core cloud, and the vehicle information of the terminal vehicles and the vehicle owner information are sent to the core cloud in the form of data packets. The core cloud queries the received data packets in an information registry of a database. If the registration information corresponding to the terminal vehicle is queried in the information registry, it is indicated that the terminal vehicle is registered, and the identity authentication for IoV can be performed on the terminal vehicle. At the same time, the RSU in the system also needs to register information in the core cloud, and the identity authentication service for IoV can be provided for the terminal vehicle only after the information registration. The information registration between the terminal vehicle and the RSU can improve the security and reliability of the RSU, thereby improving the service quality for a terminal vehicle user.

Example 3

Figure 2:
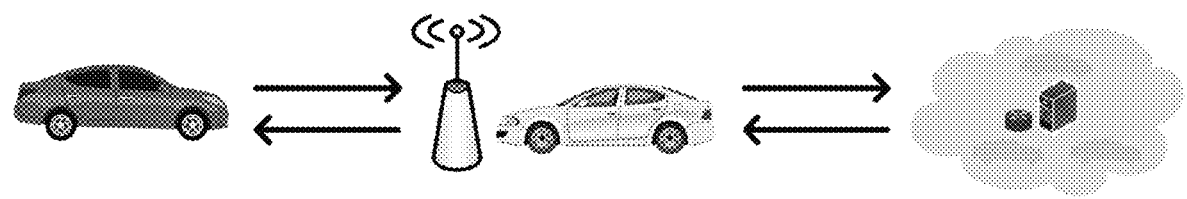
FIG. 2 is a schematic diagram of system initial authentication provided in an example of the present application.
Figure 3:
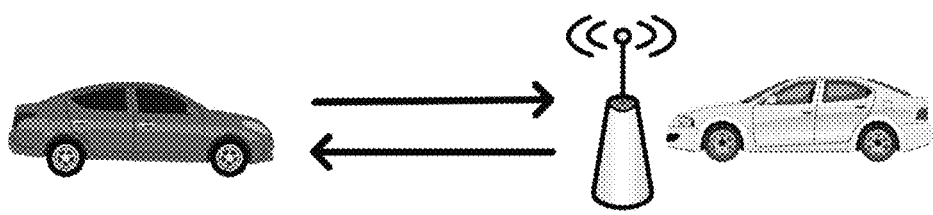
FIG. 3 is a schematic diagram of system restart authentication provided in an example of the present application.

In the example, the identity authentication of terminal vehicles for IoV is further explained, as shown in FIGS. 2 and 3.

In a preferred example, the RSU sets a first freshness threshold value according to an identity authentication request for IoV sent by the terminal vehicle, performs freshness detection on the identity authentication request for IoV sent by the terminal vehicle, retains the identity authentication request for IoV sent by the terminal vehicle within the first freshness threshold value, and verifies the registration information about the terminal vehicle; and the RSU generates a temporary session key for the verified terminal vehicle, and a temporary session public key corresponding to the temporary session key, the authentication information about the terminal vehicle and the unique attribute information about the RSU are sent to the edge cloud in a form of a data packet to perform identity authentication for IoV;
the freshness threshold value representing that the authentication request within the threshold value satisfies a time flow required for the identity authentication for IoV.

In a preferred example, the edge cloud sets a second freshness threshold value according to an identity authentication request for IoV sent by the RSU, performs freshness detection on the identity authentication request for IoV sent by the RSU, retains the identity authentication request for IoV sent by the RSU within the second freshness threshold value, and verifies the registration information about the RSU; and the edge cloud generates a corresponding temporary shared session key and signature for the verified RSU, and sends a corresponding temporary shared session public key and signature to the RSU.

In a preferred example, the RSU performs signature verification on the temporary shared session key and signature sent by the edge cloud, generates an independent temporary shared session key and signature after the verification is passed, and sends the same to the terminal vehicle; and
the terminal vehicle performs signature authentication on the temporary shared session key and the signature sent by the RSU, and after the verification is passed, the terminal vehicle establishes encrypted communication with the RSU and the edge cloud according to the temporary shared session key, to acquire a reliable network communication service.

In some examples, the initial authentication is as follows: referring to FIG. 2, the terminal vehicle $V_i$ needs to generate an identity authentication request AR and a temporary session private key $s_i \in Z^*_q$, and calculate a public key $P_i = s_i \cdot G$. The terminal vehicle $V_i$ calculates a hash value $C_1 = H(P_i \| \sigma_i^{TA} \| T_1)$ and signs it to obtain $\sigma_1^i = Sig_i(C_1)$. The terminal vehicle $V_i$ sends a message $M_1 = \{AR, P_i, PK_i, PID_i, \sigma_i^{TA}, C_1, \sigma_1^i, T_1\}$ to the RSU (or the proxy vehicle) $R_j$, where $T_1$ is a current timestamp.

After the RSU (or the proxy vehicle) $R_j$ receives the authentication request message $M_1$, a freshness of $M_1$ is checked by the first freshness threshold $|T^*_1 - T_1| < \Delta T$, where $T^*_1$ is a reception time of the message $M_1$, and $\Delta T$ is an acceptable time difference (namely, the first freshness threshold value). If it is not fresh, the RSU (or the proxy vehicle) $R_j$ discards the data packet; otherwise, $R_j$ uses $PK_{TA}$ and $PK_i$ for verification operations $Ver_j(\sigma_i^{TA})$ and $Ver_j(\sigma_1^i)$, verifying the correctness of $\sigma_i^{TA}$ and $\sigma_1^i$; if one of which is not valid, the data packet is discarded; and otherwise, $R_j$ generates $s_j \in Z^*_q$ as a temporary session private key and calculates a public key by $P_j = s_j \cdot G$. The RSU (or the proxy vehicle) $R_j$ calculates a hash value $C_2 = H(P_i \| P_j \| \sigma_j^{TA} \| T_2)$ and signs it to obtain $\sigma_2^j = Sig_j(C_2)$. The RSU (or the proxy vehicle) $R_j$ sends $M_2 = \{AR, P_i, PK_i, P_j, PK_j, C_2, \sigma_j^{TA}, \sigma_2^j, T_2\}$ to the Cybertwin edge server $C_k$.

After the Cybertwin edge server $C_k$ receives a message $M_2$, a freshness of $M_2$ is checked by a second freshness threshold $|T^*_2 - T_2| < \Delta T$, where $T^*_2$ is a reception time of the message $M_2$. If it is not fresh, the Cybertwin edge server $C_k$ discards the data packet; and otherwise, the Cybertwin edge server $C_k$ uses $PK_{TA}$ and $PK_j$ for verification operations $Ver_k(\sigma_j^{TA})$ and $Ver_k(\sigma_2^j)$, verifying the correctness of $\sigma_j^{TA}$ and $\sigma_2^j$; if one of which is not valid, the data packet is discarded; otherwise, the Cyberwin edge server $C_k$ quires whether public keys or pseudo identity certificates of the terminal vehicle $V_i$ and the RSU (or the proxy vehicle) $R_j$ have expired. If it has expired, the data packet is discarded; otherwise, the Cyberwin edge server $C_k$ generates a temporary session private key $s_k \in Z^*_q$ and calculates a corresponding public key $P_k = s_k \cdot G$. $C_k$ calculates temporary shared session keys $tsk_1 = s_k \cdot P_i$ and $tsk_2 = s_k \cdot P_j$, and uses $PK_k$ to generate $\sigma_3^k = Sig_k(tsk_1)$, $\sigma_4^k = Sig_k(tsk_2)$, and $SID_i^k = Sig_k(PID_i \| tsk_1 \| T_e)$, where $T_e$ is a validity period of $SID_i^k$, and $SID_i^k$ represents a service identity document (ID) number generated by the Cyberwin edge server $C_k$ for the terminal vehicle $V_i$. $C_k$ sends $M_3 = \{P_k, PK_k, \sigma_3^k, \sigma_4^k, SID_i^k, T_e\}$ to $R_j$, and simultaneously shares $\{PK_k, SID_i^k, T_e\}$ with all RSUs and proxy vehicles within the range, where $R_j$ represents an RSU and/or proxy vehicle, $V_i$ represents a terminal vehicle, and $C_k$ represents a Cyberwin edge server.

Upon receiving the message $M_3$, $R_j$ uses $PK_k$ for a verification operation $Ver_j(\sigma_4^k)$, and if it is not valid, the data packet is discarded. Otherwise, $R_j$ calculates temporary shared session keys $tsk_2 = s_j \cdot P_k$ and $tsk_3 = s_j \cdot P_k$, and generates a signature $\sigma_5^j = Sig_j(tsk_3)$. A message $M_4 = \{PK_j, PK_k, \sigma_j^{TA}, P_j, P_k, \sigma_3^k, \sigma_5^j, SID_i^k, T_e\}$ is then sent to $V_i$.

After receiving the message $M_4$, $V_i$ uses $PK_k$ for a verification operation $Ver_i(\sigma_j^{TA})$, and if it is not valid, the data packet is discarded; otherwise, $V_i$ calculates temporary shared session keys $tsk'_1 = s_i \cdot P_k$ and $tsk'_3 = s_i \cdot P_j$. $V_i$ uses $PK_k$ and $PK_j$ for verification operations $Ver_i(\sigma_3^k)$ and $Ver_i(\sigma_5^j)$, verifying the correctness of $\sigma_3^k$ and $\sigma_5^j$; and if one of which is not valid, the data packet is discarded. Otherwise, the identity authentication of the initial terminal vehicle is completed, temporary shared session key $tsk_1$, $tsk_2$, and $tsk_3$ are successfully established among $V_i$, $R_j$, and $C_k$, and subsequent encrypted communication is performed.

In some examples, the re-authentication is as follows: referring to FIG. 3, $V_i$ needs to generate an identity authentication request AR and a temporary session private key $s_i \in Z^*_q$, and calculate a public key $P_i = s_i \cdot G$. A hash value $C_1 = H(SID_i^k \| P_i \| T_1)$ is calculated and signed to obtain $\sigma_1^i = Sig_i(C_1)$. A message $M_1 = \{AR, SID_i^k, P_i, C_1, \sigma_1^i, T_1\}$ is sent to the RSU (or the proxy vehicle) $R'_j$, where $T_1$ is a current timestamp.

After $R'_j$ receives the authentication request message $M_1$, a freshness of $M_1$ is checked by the first freshness threshold value $|T^*_1 - T_1| < \Delta T$, where $T^*_1$ is a reception time of the message $M_1$, and $\Delta T$ is an acceptable time difference. If the message is not fresh, the data packet is discarded; otherwise, $R'_j$ generates $s'_j \in Z^*_q$ as a temporary session private key and calculates a public key by $P'_j = s'_j \cdot G$. $R'_j$ generates $tsk_1 = s'_j \cdot P_i$ and $\sigma_2^{j'} = Sig_j(tsk_1 \| T_2)$. Finally, $R'_j$ sends $M_2 = \{PK_{j'}, \sigma_j^{TA}, P'_j, \sigma_2^{j'}, T_2\}$ to $V_i$, where $T_2$ is a current timestamp.

After receiving the message $M_2$, $V_i$ uses $PK_{TA}$ for a verification operation $Ver_i(\sigma_j^{TA})$, and if the message is not valid, the data packet is discarded; otherwise, $V_i$ generates $tsk'_1 = s_i \cdot P_j$, and executes a verification operation $Ver_i(\sigma_2^{j'})$. If it is not valid, the data packet is discarded; otherwise, the re-authentication is completed, and $V_i$ and $R'_j$ can share information through encrypted communication by the temporary shared session key $tsk_1$.

In the example, the setting of the first freshness threshold value and the second freshness threshold value can effectively exclude an identity authentication application for IoV sent by the terminal vehicle and having a large time difference, thereby reducing the workload of the RSU and the edge cloud, and improving the efficiency of the identity authentication for IoV of the system, and at the same time, ensuring that the terminal vehicle user can obtain a more effective network connection service. The setting of the temporary shared session key and the signature for identity authentication can effectively improve the security and reliability of the system, thereby improving the service quality for the terminal vehicle user. In the present disclosure, the temporary shared session key is generated between the two communication parties mainly by using an Edwards-curve digital signature algorithm (EdDSA) and a Diffie-Hellman algorithm; and the identity authentication solution is divided into two stages: initial authentication and subsequent re-authentication, to improve the efficiency of identity authentication for IoV.

The above is only the example of the present disclosure, which does not limit the patent protection of the present disclosure. Any equivalent structure or equivalent process transformation made by using the contents of the specification and drawings of the present disclosure, or directly or indirectly applied to other related technical fields, are equally included in the scope of patent protection of the present disclosure.

The invention claimed is:

1. An identity authentication system for distributed Internet of vehicles (IoV), comprising a core cloud, a plurality of edge clouds, a plurality of road side units (RSUs) and a plurality of terminal vehicles, wherein
   the core cloud establishes a wired communication connection with each of the edge clouds, each of the edge clouds establishes a wired communication connection with the plurality of RSUs, and each of the RSUs establishes a wireless communication connection with the plurality of terminal vehicles, a wired connection being established between the edge clouds;
   the core cloud stores registration information about the terminal vehicles and the RSUs, and the core cloud shares the registration information about the terminal vehicle and the RSUs to the edge clouds;
   the terminal vehicle sends an identity authentication request for IoV to the RSU; the RSU acquires the registration information about the terminal vehicle from the edge cloud; the RSU verifies identity information about the terminal vehicle according to the registration information; after the verification is passed, the RSU initiates an identity authentication request to the edge cloud; the edge cloud performs identity verification on the RSU according to the registration information; after the identity verification of the RSU is passed, the edge cloud backs up the identity information about the terminal vehicle among all the edge clouds and generates a temporary shared session key; and the edge cloud sends the temporary shared session key to the RSU, the RSU sends the temporary shared session key to the terminal vehicle, and the terminal vehicle, the RSU and the edge cloud establish encrypted communication between each other according to the temporary shared session key to provide a network communication service for the terminal vehicle;
   the edge cloud is arranged with a Cybertwin edge server, and the Cybertwin edge server is used for acquiring and recording behavior data of authenticated terminal vehicles within a signal range of the edge cloud in real time, and quickly backing up and migrating the behavior data among all the edge clouds;
   the Cybertwin edge server detects, in real time, a vehicle density of terminal vehicles establishing authentication communication with the RSU within the signal range of the edge cloud, and sets a vehicle density threshold value according to the vehicle density; and when a vehicle density in a certain RSU within the signal range of the edge cloud exceeds the vehicle density threshold value, the Cybertwin edge server performs proxy authentication on terminal vehicles in the RSU; Cybertwin representing network twinning;

the Cybertwin edge server sets a proxy selection factor $\delta_m$ according to the vehicle density threshold value, and selects the terminal vehicle within the signal range of the edge cloud to perform proxy authentication according to the proxy selection factor, an expression of the proxy selection factor $\delta_m$ being:

$$\delta_m = \alpha_1 * \sum_{l=1}^{N} \left| \frac{d_{m,l}}{ND_{max}} \right| + \alpha_2 * \sum_{l=1}^{N} \left| \frac{v_l - v_m}{Nv_m} \right| + \alpha_3 * \frac{C_{max} - C_m}{C_{max}} + \alpha_4 * \frac{Rep_{max} - Rep_m}{Rep_{max}}$$

where $\alpha_1, \alpha_2, \alpha_3, \alpha_4 \in [0,1]$ represent natural numbers and $\alpha_1 + \alpha_{2+3} + \alpha_4 = 1$; $d_{m,l}$ represents a Euclidean distance between a terminal vehicle $v_m$ and a terminal vehicle $v_l$; N represents a total number of vehicles within a communication range of an edge cloud; $D_{max}$, $C_{max}$, and $Rep_{max}$ represent a maximum communication distance, a maximum computing power, and a maximum credit score of the terminal vehicle, respectively; $C_m$ represents a computing power of the terminal vehicle $v_m$; and $Rep_m$ represents a credit score of the terminal vehicle $v_m$; and the system further comprising an authentication proxy vehicle, used for selecting, by the Cybertwin edge server, a terminal vehicle within a signal range as a dynamic authentication proxy vehicle to perform identity verification for IoV on other terminal vehicles according to a proxy factor when a vehicle density in a certain RSU in an edge cloud range to which the RSU belongs exceeds the vehicle density threshold value.

2. The identity authentication system for distributed IoV according to claim 1, wherein the terminal vehicle sends an information registration application to the core cloud, and sends vehicle attribute information to the core cloud; the core cloud queries the vehicle attribute information sent by the terminal vehicle in a database, if registration information consistent with the vehicle attribute information about the terminal vehicle is queried, it being indicated that the terminal vehicle has registered information in the core cloud; and if vehicle attribute information about the terminal vehicle is not queried, the core cloud generating a pseudo identity for the terminal vehicle; and the core cloud saves the pseudo identity to the database and sends the same to the terminal vehicle;

the vehicle attribute information comprising vehicle information and vehicle owner information.

3. The identity authentication system for distributed IoV according to claim 1, wherein the RSU sends an information registration application to the core cloud, and sends unique attribute information about the RSU to the core cloud; the core cloud queries the unique attribute information sent by the RSU in the database, if registration information consistent with the unique attribute information about the RSU is queried, it being indicated that the RSU has registered information in the core cloud; and if the unique attribute information about the RSU is not queried, the core cloud establishing a piece of signature registration information for the RSU; and the core cloud saves the signature registration information to the database and sends the same to the RSU;

the unique attribute information comprising operator information, deployment location information and a device number.

4. The identity authentication system for distributed IoV according to claim 1, wherein the RSU sets a first freshness threshold value according to an identity authentication request for IoV sent by the terminal vehicle, performs freshness detection on the identity authentication request for IoV sent by the terminal vehicle, retains the identity authentication request for IoV sent by the terminal vehicle within the first freshness threshold value, and verifies the registration information about the terminal vehicle; and the RSU generates a temporary session key for the verified terminal vehicle, and a temporary session public key corresponding to the temporary session key, the authentication information about the terminal vehicle and the unique attribute information about the RSU are sent to the edge cloud in a form of a data packet to perform identity authentication for IoV;

the freshness threshold value representing that the authentication request within the threshold value satisfies a time flow required for the identity authentication for IoV.

5. The identity authentication system for distributed IoV according to claim 4, wherein the edge cloud sets a second freshness threshold value according to an identity authentication request for IoV sent by the RSU, performs freshness detection on the identity authentication request for IoV sent by the RSU, retains the identity authentication request for IoV sent by the RSU within the second freshness threshold value, and verifies the registration information about the RSU; and the edge cloud generates a corresponding temporary shared session key and signature for the verified RSU, and sends a corresponding temporary shared session public key and signature to the RSU.

6. The identity authentication system for distributed IoV according to claim 5, wherein the RSU performs signature verification on the temporary shared session key and signature sent by the edge cloud, generates an independent temporary shared session key and signature after the verification is passed, and sends the same to the terminal vehicle; and the terminal vehicle performs signature authentication on the temporary shared session key and the signature sent by the RSU, and after the verification is passed, the terminal vehicle establishes encrypted communication with the RSU and the edge cloud according to the temporary shared session key, to acquire a reliable network communication service.

* * * * *